United States Patent
Iwata et al.

(10) Patent No.: US 8,941,257 B2
(45) Date of Patent: Jan. 27, 2015

(54) WIND POWER GENERATOR (71) Applicant: Hitachi, Ltd., Chiyoda-ku, Tokyo (JP)

(72) Inventors: Takeshi Iwata, Hitachinaka (JP);
Norihito Yanagita, Hitachinaka (JP);
Tatsuro Kato, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/859,045

(22) Filed: Apr. 9, 2013

(65) Prior Publication Data
US 2013/0270825 A1  Oct. 17, 2013

(30) Foreign Application Priority Data

Apr. 13, 2012  (JP) .................................. 2012-091763

(51) Int. Cl.
*F03D 11/00*  (2006.01)
*H02P 9/02*  (2006.01)

(52) U.S. Cl.
CPC ................. *H02P 9/02* (2013.01); *Y02E 10/722* (2013.01); *Y02E 10/721* (2013.01); *Y02E 10/726* (2013.01)
USPC .......................................................... 290/55

(58) Field of Classification Search
CPC ....................................................... F03D 11/00
USPC .......................................................... 290/55
See application file for complete search history.

(56) References Cited

U.S. PATENT DOCUMENTS

| | | | |
|---|---|---|---|
| 7,057,305 B2* | 6/2006 | Kruger-Gotzmann et al. | 290/55 |
| 7,111,668 B2* | 9/2006 | Rurup | 165/134.1 |
| 7,161,260 B2* | 1/2007 | Kruger-Gotzmann et al. | 290/55 |
| 7,895,847 B2* | 3/2011 | Larsen | 62/93 |
| 8,092,151 B2* | 1/2012 | Becker | 415/112 |
| 2010/0061853 A1* | 3/2010 | Bagepalli | 416/95 |
| 2010/0127502 A1 | 5/2010 | Uchino et al. | |
| 2011/0304149 A1* | 12/2011 | Pasteuning et al. | 290/55 |

FOREIGN PATENT DOCUMENTS

| | | | |
|---|---|---|---|
| EP | 2466128 A1 * | 6/2012 | |
| GB | 734487 A * | 6/1950 | |
| JP | 2004-301094 A | 10/2004 | |
| JP | 2005-282954 A | 10/2005 | |
| JP | 2010-31722 A | 2/2010 | |
| WO | WO 2012027954 A1 * | 3/2012 | |

* cited by examiner

*Primary Examiner* — Joseph Waks
(74) *Attorney, Agent, or Firm* — Crowell & Moring LLP (57) ABSTRACT

In a wind power generator, a nacelle is located on an upper portion of a support rod, a rotor head having wind turbine blades fitted thereto is rotatably supported to a front end side of the nacelle, and a main shaft rotating integrally with the rotor head, a gear box coupled with the main shaft which rotates while the wind turbine blades receive a wind power, a power generator having a rotor driven by a shaft output of the gear box, a brush, and a slip ring, and a humidity management device controlling humidity inside of the power generator having the brush and the slip ring, are installed in an interior of the nacelle.

11 Claims, 8 Drawing Sheets

WIND POWER GENERATOR

BACKGROUND

The present invention relates to a wind power generator, and more particularly to a wind power generator suitable for the installation of a power generator having a brush and a slip ring mechanism inside of a nacelle.

There has been known a wind power generator that generates power with the use of a wind power which is a natural energy.

In one type of the wind power generators, a power generation mechanism such as the power generator having the brush and the slip ring mechanism is installed inside of the nacelle. In the wind power generator of this type, devices such as the power generator inside of the nacelle are cooled by ventilating air inside of the nacelle by a ventilation fan because there is a risk that the devices are heated during operation, and damaged with a rise in temperature.

For example, as disclosed in Japanese Unexamined Patent Application Publication No. 2010-31722, in the above-mentioned wind power generator, an inlet is provided in a nacelle lateral surface where a negative pressure is created due to an airflow flowing outside of the nacelle. The amount of external air sucked from the inlet is increased to cool an interior of the nacelle to suppress a rise in temperature inside of the nacelle.

Also, for example, Japanese Unexamined Patent Application Publication No. 2004-301094 discloses a wind power generator in which there is a risk that an electric component is subject to dew condensation, resulting in a failure when the power generator stops the operation due to heat generation inside of the nacelle during the operation of the power generator. Therefore, in the wind power generator, a fan is driven under the control when the operation of the power generator stops, and cooling and dehumidification inside of the nacelle are conducted to prevent dew condensation on the electric component.

SUMMARY

Incidentally, in the wind power generator in which the power generator is provided with the brush and the slip ring mechanism, the conditions (temperature, humidity, etc.) of the external environment are different depending on an installation side (sea, mount, sands, etc.) and the season. Therefore, it is desirable that the wind power generator reduces a wear volume of the brush with being adapted to an extensive installation site without depending on the external environment.

However, in the wind power generator in which the power generator is provided with the brush and the slip ring mechanism, a temperature management of the brush and the slip ring mechanism which are installed in the interior of the power generator is conducted. However, a humidity management of the brush and the slip ring mechanism is not conducted. As a result, a change in the wear rate of the brush due to a change in the humidity cannot be managed.

In particular, if the humidity of the brush and the slip ring mechanism is high, the number of incidence of arcs is increased, and a contact surface gets rough. Also, if the humidity of the brush and the slip ring mechanism is low, a lubricating property of the contact surface of the brush and the slip ring is low. Thus, there arises such a problem that the contact surface is abnormally worn in the respective cases.

Also, the worn brush is replaced with a fresh one, and a time for replacement of the brush is conducted when the brush is worn by a given amount (a worker visually checks the brush at the time of maintenance, or determines wear by an attached limit switch). However, the wear rate is changed, the wear volume of the brush is difficult to predict, resulting in a need to increase the maintenance frequency. That is, there arises such a problem that a burden of the maintenance is increased.

The above-described Japanese Unexamined Patent Application Publication No. 2010-31722 and Japanese Unexamined Patent Application Publication No. 2004-301094 disclose that the nacelle is ventilated with the use of the fan in order to suppress a rise in temperature inside of the nacelle or prevent the dew condensation on the device inside of the nacelle. However, there is no disclosure in those publications of managing the humidity of the brush and the slip ring mechanism to grasp and reduce the wear volume of the brush.

The present invention has been made in view of the above circumstances, and therefore an object of the present invention is to provide a wind power generator that can remove an influence of humidity on the wear rate of the brush, and reduce the wear volume of the brush with being adapted to an extensive installation site.

According to the present invention, in order to achieve the above object, there is provided a wind power generator in which a nacelle is located on an upper portion of a support rod, a rotor head having wind turbine blades fitted thereto is rotatably supported to a front end side of the nacelle, and a main shaft that rotates integrally with the rotor head, a gear box that is coupled with the main shaft which rotates while the wind turbine blades receive a wind power, a power generator having a rotor driven by a shaft output of the gear box, a brush, and a slip ring, and a humidity management device that controls humidity inside of the power generator having the brush and the slip ring are installed in an interior of the nacelle.

More specifically, the humidity management device includes a humidity sensor that measures the humidity inside of the power generator having the brush and the slip ring, a humidifier that compares a humidity value inside of the power generator having the brush and the slip ring, which is measured by the humidity sensor, with an optimum humidity value inside of the power generator having the brush and the slip ring, which is set in advance, and humidifies the interior of the power generator when the compared humidity value is equal to or lower than the set value, and a dehumidifier that dehumidifies the interior of the power generator when the compared humidity value is larger than the set value.

According to the wind power generator of the present invention, even if the conditions of the external environment are different depending on the installation site and the season, an influence of the humidity on the wear rate of the brush can be removed, and the wear volume of the brush can be reduced with being adapted to the extensive installation site.

DETAILED DESCRIPTION

Hereinafter, a wind power generator according to embodiments of the present invention will be described with reference to the accompanying drawings. In the respective embodiments, the same parts are denoted by identical reference numerals or symbols for description.

First Embodiment

Figure 1:
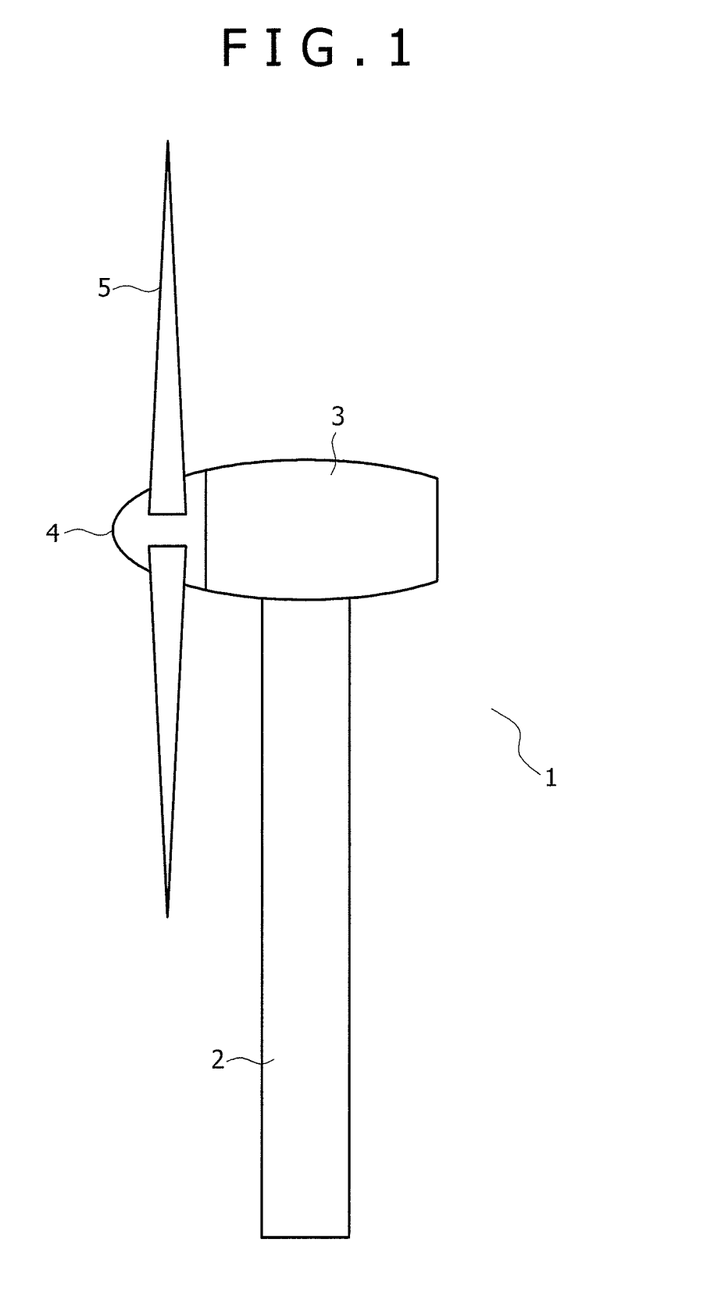
FIG. 1 is a diagram illustrating an outline configuration of a wind power generator according to a first embodiment of the present invention.

FIGS. 1 to 5 illustrate a wind power generator according to a first embodiment of the present invention. As illustrated in FIG. 1, a wind power generator 1 according to the present invention is roughly configured so that a nacelle 3 is located on an upper portion of a support rod 2, and a rotor head 4 having wind turbine blades 5 fitted thereto is rotatably supported to a front end side of the nacelle 3.

Figure 2:
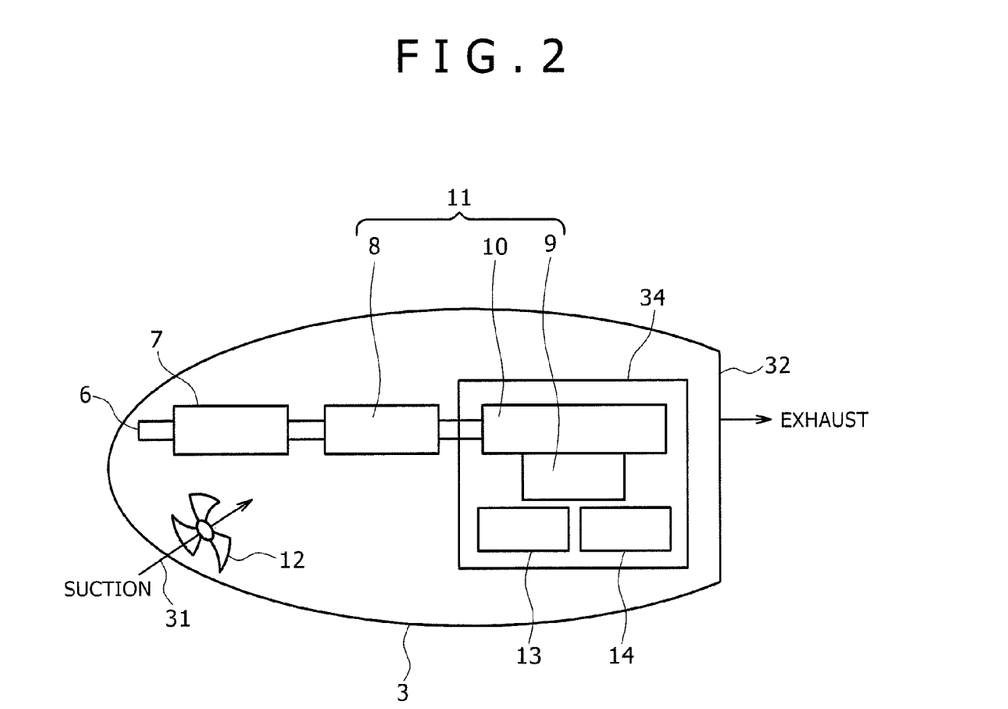
FIG. 2 is a diagram illustrating a structural example inside of a nacelle of the wind power generator in FIG. 1.

As illustrated in FIG. 2, in an interior of the nacelle 3 are installed a main shaft 6 that is coupled with the rotor head 4 so as to rotate integrally, a gear box 7 that is coupled with the main shaft 6 which rotates while the wind turbine blades 5 receive a wind power, and a power generator 11 having a rotor 8 driven by a shaft output of the gear box 7, and a brush 9 and a slip ring 10 which are disposed inside a housing 34.

Also, a ventilation fan 12 is located at an appropriate portion inside of the nacelle 3, and the ventilation fan 12 is driven to discharge an external air introduced from an inlet 31 formed in a front end of the nacelle 3 from an outlet 32 communicating with a fan exit to an external of the nacelle 3 to ventilate and cool the interior of the nacelle 3.

In the wind power generator 1 thus configured, the rotor head 4 having the wind turbine blades 5 that convert a wind power into a rotating force, and the main shaft 6 rotate to generate a shaft output. As a result, a power generation using the wind power can be conducted by the power generator 11 driven through the gear box 7 coupled to the main shaft 6.

In this embodiment, a humidity management device including a humidifier 13 and a dehumidifier 14 is located in the vicinity of the brush 9 and the slip ring 10 inside of the nacelle 3 (inside of the housing 34), and humidity inside of the power generator 11 having the brush 9 and the slip ring 10 is controlled by the humidity management device including the humidifier 13 and the dehumidifier 14.

A description will be given of a configuration example in which the humidifier 13 and the dehumidifier 14 configuring the above-mentioned humidity management device are located inside of the power generator 11 having the brush 9 and the slip ring 10, with reference to FIG. 3.

Figure 3:
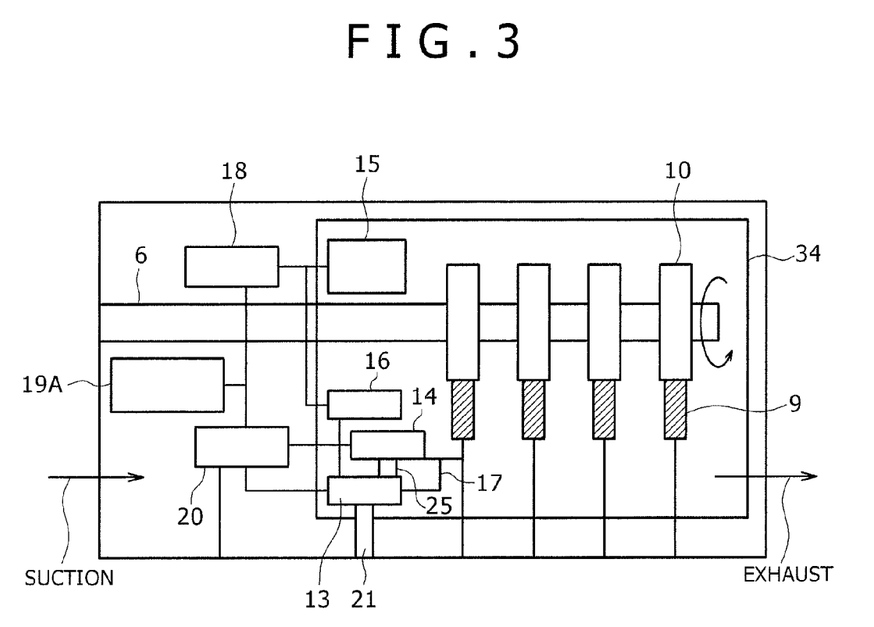
FIG. 3 is a diagram illustrating a structural example in which a humidity management device is installed in the vicinity of a brush and a slip ring, which is the details inside of the nacelle in FIG. 2.

As illustrated in FIG. 3, the humidifier 13, the dehumidifier 14, and a humidity sensor 15 are located in the vicinity of the brush 9 and the slip ring 10 configuring the power generator 11 (inside of the housing 34), and a water level indicator 16 is fitted to the humidifier 13. Also, the humidifier 13 and the dehumidifier 14 are located in the vicinity of the brush 9 and the slip ring 10 and at an upstream side of an airflow by the ventilation fan 12 (at an upstream side of the interior of the housing 34).

The humidifier 13 is connected to the dehumidifier 14 and an arithmetic unit 20, and on the other hand, the humidity sensor 15 and the water level indicator 16 are connected to an input unit 18. A signal of the input unit 18 is input to the arithmetic unit 20 together with a signal of a humidity setting unit 19A. Also, water taken in the dehumidifier 14 is fed to the humidifier 13 through a water supply pipe 25, and recycled by the humidifier 13.

A power supply of the humidifier 13 and the dehumidifier 14 are obtained by an electric power generated by the power generator 11 through a power supply line 17.

Subsequently, a description will be given of a humidity control inside of the power generator 11 having the brush 9 and the slip ring 10 in the humidity management device according to this embodiment.

First, a humidity inside of the power generator 11 from the humidity sensor 15 and a value of a water level in the humidifier 13 from the water level indicator 16 are input to the input unit 18. On the other hand, in the humidity setting unit 19A, an optimum humidity value inside of the power generator 11 is set in advance. In the arithmetic unit 20, a measured value (humidity) inside of the power generator 11, which is measured by the humidity sensor 15 from input unit 18 is compared with a set range of the optimum humidity inside of the power generator 11, which is set in advance from the humidity setting unit 19A to determine the operation of the humidifier 13 and the dehumidifier 14.

Figure 4:
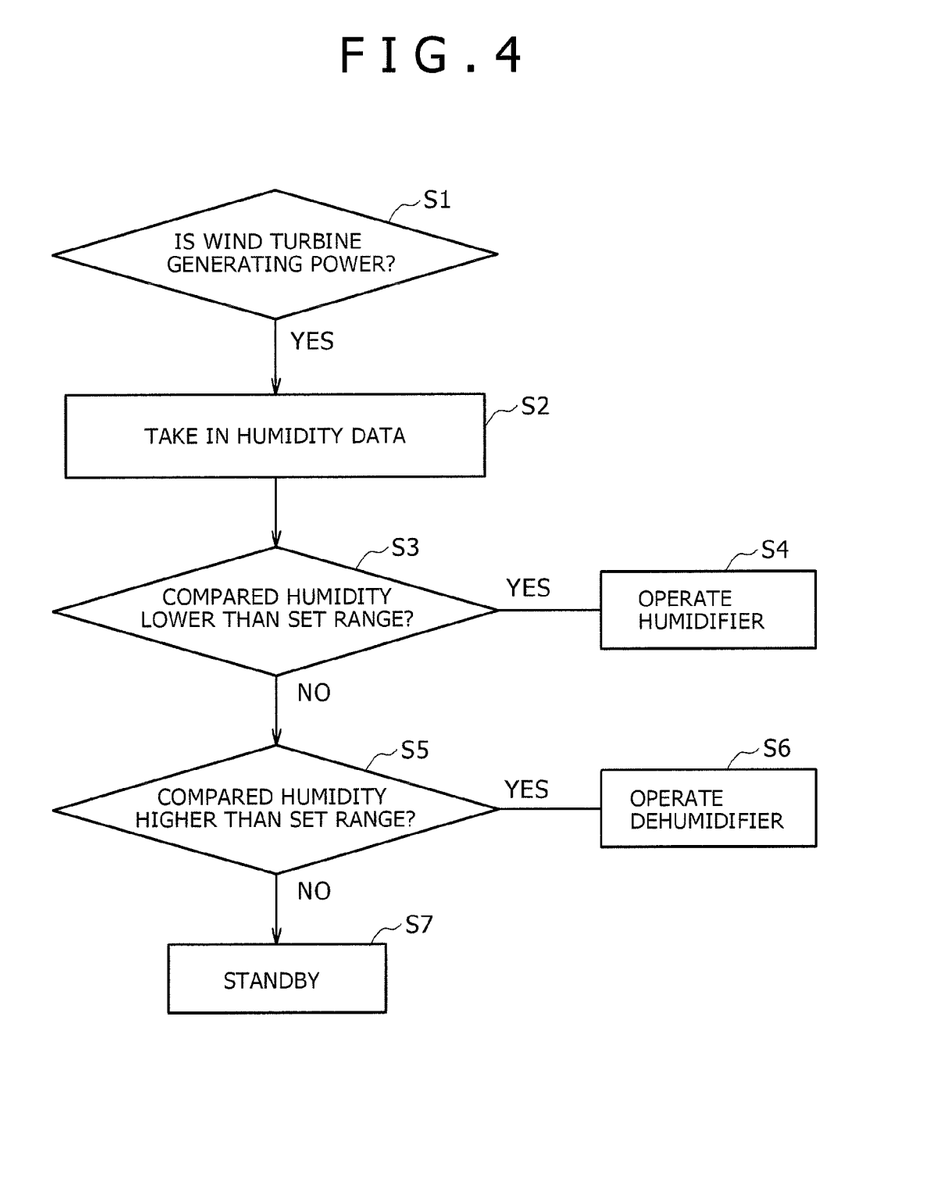
FIG. 4 is a flowchart illustrating an example of a process of an arithmetic unit in the humidity management device of the brush and the slip ring in the wind power generator according to the first embodiment of the present invention.

FIG. 4 is a flowchart of the process of the above-mentioned arithmetic unit 20.

As illustrated in FIG. 4, if it is determined that a wind turbine is under suspension in Step S1 in which "is the wind turbine generating a power?", the humidifier 13 and the dehumidifier 14 do not operate. If it is determined that the wind turbine is generating the power, humidity data is taken in (Step S2).

Subsequently, the humidity data is compared with the predetermined set range of the optimum humidity inside of the power generator 11. If the compared humidity value is lower than the set range (Step S3), the humidifier 13 operates (Step S4). On the other hand, if the compared humidity value is larger than the set range (Step S5), the dehumidifier 14 operates (Step S6). Also, if the humidity data falls within the set range of the optimum humidity value (Step S5), since the environment is optimum, the humidifier 13 and the dehumidifier 14 do not operate, and become in a standby state (Step S7).

Figure 5:
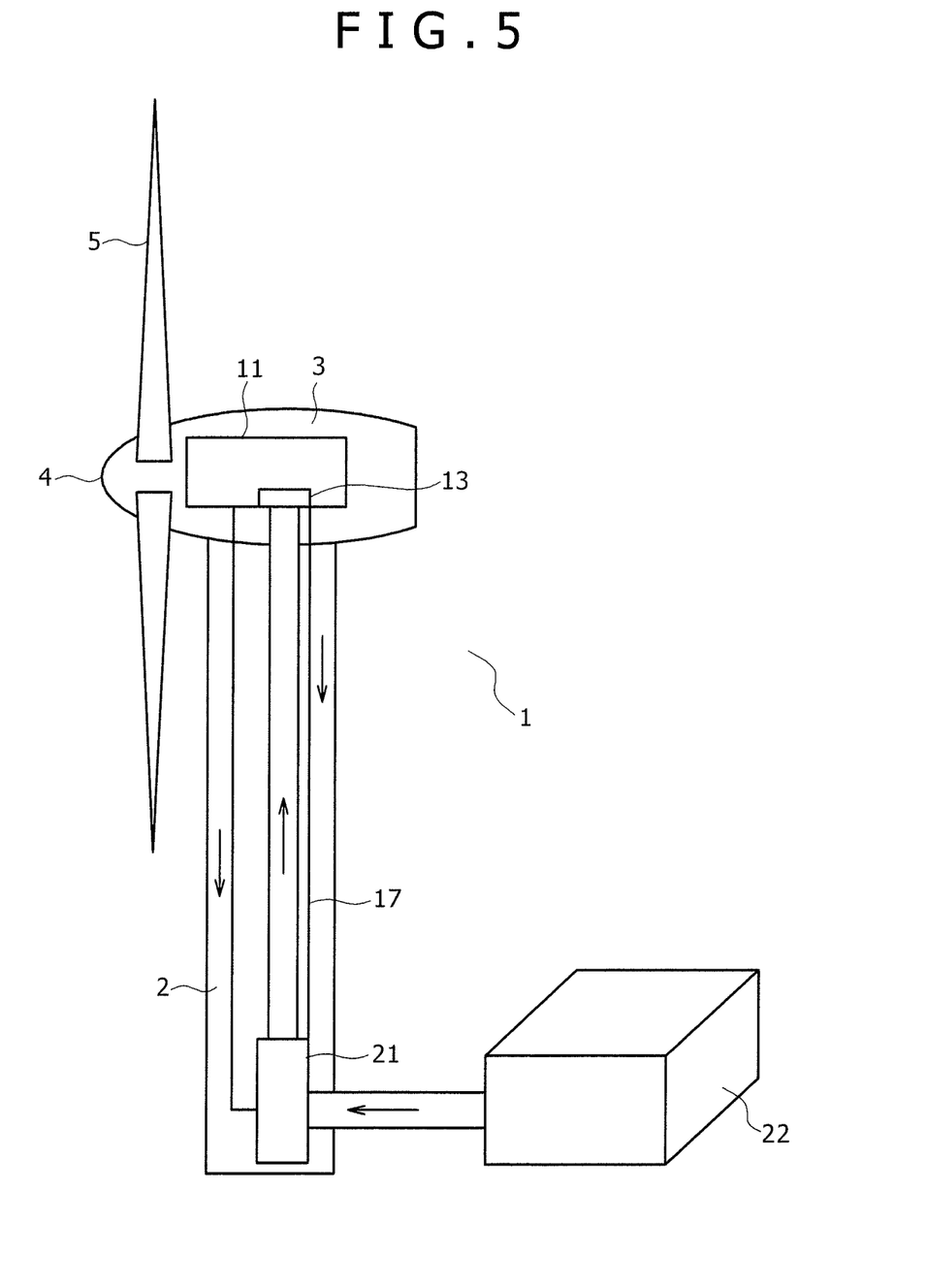
FIG. 5 is a diagram illustrating a structural example in which water is supplied to a humidifier in the humidity management device of the brush and the slip ring in the wind power generator according to the first embodiment of the present invention.

FIG. 5 illustrates an example in which water is supplied to the humidifier 13 in the humidity management device according to this embodiment.

As illustrated in FIG. 5, if it is determined from the water level indicator 16 that a water level of the humidifier 13 is low, a pump 21 located within the support rod 2 operates, and water is pumped up from a water tank 22 connected with the pump 21, and supplied to the humidifier 13 inside of the nacelle 3.

Also, when the wind power generator 1 is a floating wind power generation device installed on the ocean, the water tank 22 is not installed, but seawater may be pumped up from the sea by a pump to replenish water to the humidifier 13. In any cases, a power supply of the pump that pumps up the water is obtained by supplying the electric power generated by wind power generator 1 through the power supply line 17.

With the provision of the above wind power generator 1 according to this embodiment, even if the conditions of the external environment are different depending on the installation site and the season, the humidity inside of the power generator 11 having the brush 9 and the slip ring 10 is measured by the humidity sensor 15, the measured humidity data inside of the power generator 11 is compared with the optimum humidity set value within the power generator 11, which is set by the humidity setting unit 19A in advance. If the compared humidity value is equal to or lower than the set value, the humidifier 13 operates, and if the compared humidity value is larger than the set value, the dehumidifier 14 operates. As a result, the humidity inside of the power generator 11 having the brush 9 and the slip ring 10 can fall within a given range.

Also, because an influence of the humidity on the wear rate of the brush 9 can be removed, a risk of the abnormal wear of the brush 9 can be avoided, and a constant brush wear rate is kept. As a result, a brush replacement plane is facilitated, and a burden of the maintenance can be reduced.

Therefore, according to the wind power generator of this embodiment, even if the conditions of the external environment are different depending on the installation site and the season, an influence of the humidity on the wear rate of the brush can be removed, and the wear volume of the brush can be reduced with being adapted to the extensive installation site.

Second Embodiment

Subsequently a wind power generator according to a second embodiment of the present invention will be described with reference to FIGS. 6 and 7.

Figure 6:
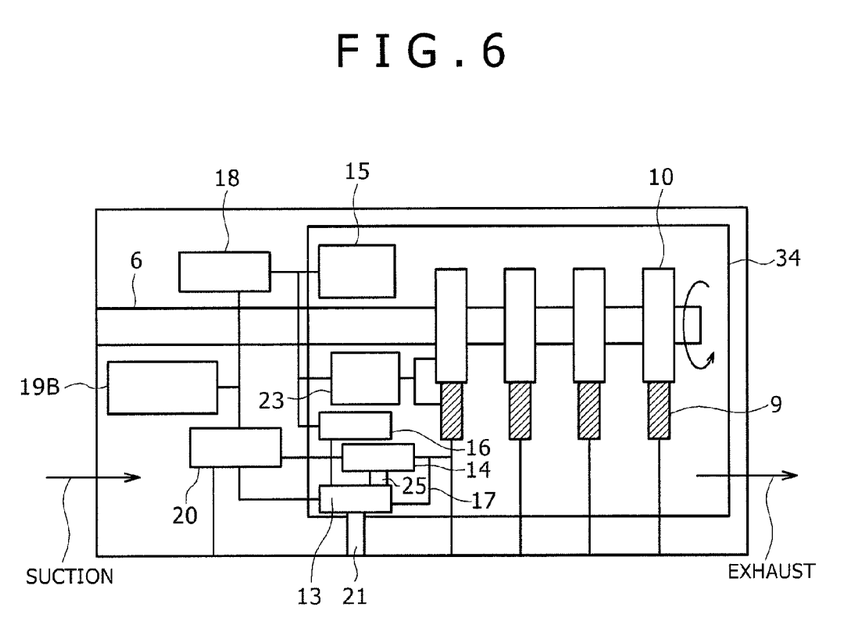
FIG. 6 is a diagram illustrating a structural example in which a voltage measurement system is added to a configuration of FIG. 3 in a wind power generator according to a second embodiment of the present invention.
Figure 7:
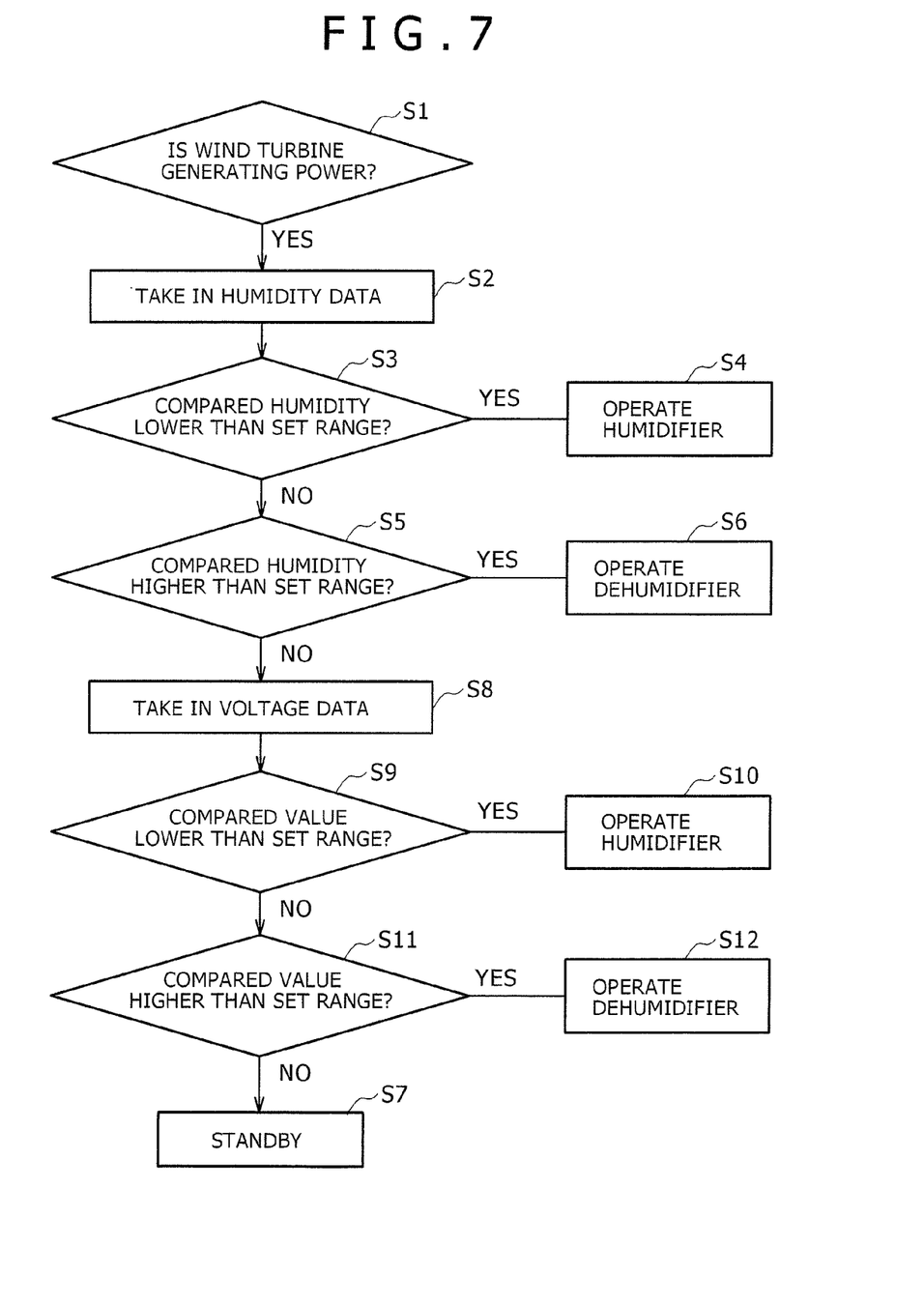
FIG. 7 is a flowchart illustrating an example of a process of an arithmetic unit in a humidity management device of a brush and a slip ring in the wind power generator according to the second embodiment of the present invention.

In the embodiment illustrated in FIGS. 6 and 7, not only the humidity inside of the power generator 11 having the brush 9 and the slip ring 10, but also a contact voltage drop between the brush 9 and the slip ring 10 are additionally to be subjected to feedback.

FIG. 6 is a configuration example illustrating the brush 9 and the slip ring 10 in the second embodiment. In the configuration diagram of the first embodiment illustrated in FIG. 3, a description of the parts having the same functions as those of the configurations denoted by identical symbols illustrated in FIG. 3 which have already been described will be omitted.

As illustrated in the figure, in this embodiment, a voltage measurement system 23 that measures a voltage between the brush 9 and the slip ring 10 is located in the vicinity of the brush 9 and the slip ring 10 configuring the power generator 11 (inside of the housing 34). Measurement data of the voltage measurement system 23 is input to the input unit 18.

That is, in this embodiment, the measurement data of the voltage measurement system 23 is input to the input unit 18 together with the outputs of the humidity sensor 15 and the water level indicator, 16. A humidity/voltage setting unit 19B sets an optimum humidity within the power generator 11 also taking a contact voltage drop between the brush 9 and the slip ring 10 into account. The arithmetic unit 20 compares the measured value from the input unit 18 with the set value from the humidity/voltage setting unit 19B to determine the operation of the humidification of the humidifier 13 and the dehumidification of the dehumidifier 14.

FIG. 7 is a flowchart illustrating an example of a process of the arithmetic unit in the humidity management device of the brush 9 and the slip ring 10 in the wind power generator according to the second embodiment. Steps S1 to S6 illustrated in FIG. 7 are identical with those in the first embodiment, and therefore its description will be omitted.

The contact voltage drop between the brush 9 and the slip ring 10 in this embodiment can be also used as an index of a wear state of the brush 9 for the following reasons.

That is, in this embodiment, if the contact voltage drop between the brush 9 and the slip ring 10, which is measured by the voltage measurement system 23, is high, the amount of an oxide film is large, and a contact resistance is high, and therefore the wear volume of the brush 9 is increased by heating. Also, if the contact voltage drop between the brush 9 and the slip ring 10, which is measured by the voltage measurement system 23, is low, it is conceivable that because the amount of the oxide film is small, a lubricating property between the brush 9 and the slip ring 10 is low, and the wear volume of the brush 9 is increased.

Accordingly, the contact voltage drop between the brush 9 and the slip ring 10 also has an optimum range like the above-mentioned humidity. For that reason, in Steps subsequent to Step S8 in FIG. 7, the following operation is conducted.

Referring to FIG. 7, if the compared humidity inside of the power generator 11 falls within a set range (Step S5), the voltage data from the voltage measurement system 23 is taken in (Step S8). If the voltage data is compared with the set range from the humidity/voltage setting unit 19B, and the compared voltage value is lower than the set range (Step S9), it is determined that the amount of the oxide film functioning to reduce the brush wear between the brush 9 and the slip ring 10 is small, and the humidifier 13 is operated (Step S10) to promote the generation of the oxide film.

On the other hand, if the compared voltage value is larger than the set range (Step S11), it is determined that the oxide film is excessive, and the dehumidifier 14 is operated (Step S12) to decrease the amount of oxide film. Also, if the compared voltage value is compared with the set range, and falls within the set range (Step S9), it is determined that the environment is optimum. Therefore, the humidifier 13 and the dehumidifier 14 do not operate, and become in a standby state (Step S7).

Even in this embodiment, not only the same advantages as those in the first embodiment are obtained, but also a contact interface between the brush 9 and the slip ring 10 can be improved, resulting in such an advantage that the amount of brush wear can be surely reduced. Also, if a contact voltage measurement system is located between the brush 9 and the slip ring 10, a double feedback control can be conducted in cooperation with the humidity management device described in the first embodiment, and a more optimum humidity state can be held.

Third Embodiment

Subsequently, a wind power generator according to a third embodiment of the present invention will be described with reference to FIG. 8.

Figure 8:
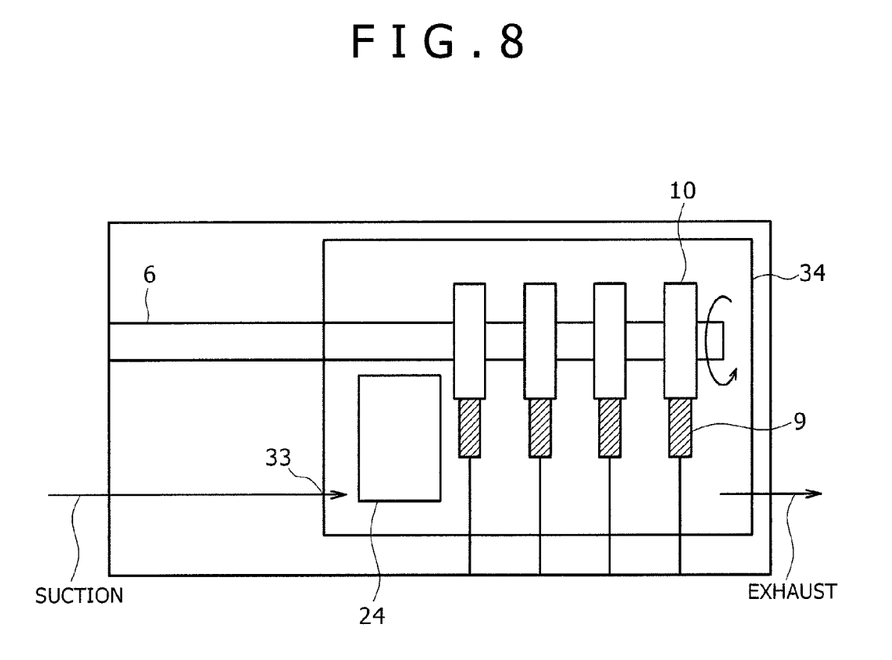
FIG. 8 is a diagram illustrating a structural example of a brush and a slip ring mechanism in a humidity management device using a humidity adjustment sheet in a wind power generator according to a third embodiment of the present invention.

In the humidity management device according to the third embodiment illustrated in FIG. 8, the humidifier 13 and the dehumidifier 14 described in the first and second embodiments are replaced with a humidity adjustment sheet 24 installed in the vicinity of the brush 9 and the slip ring 10.

That is, the humidity adjustment sheet 24 made of a synthetic rubber containing superabsorbent polymer therein is located in a space between the brush 9, the slip ring 10, and an inlet 33.

The humidity adjustment sheet 24 according to this embodiment can adsorb moisture if the humidity is high, and can release the moisture if the humidity is low. As a result, even if the conditions of the external environment are different depending on the installation site and the season, an influence of the humidity on the wear rate of the brush can be removed, and the wear volume of the brush can be reduced with being adapted to the extensive installation site.

Also, in this embodiment, the humidity inside of the power generator can be adjusted without addition of a device requiring the power supply, and a failure can be avoided by preventing the dew condensation while the power generator stops the operation.

The present invention is not limited to the above respective embodiments, and includes various modified examples. For example, in the above-mentioned embodiments, in order to easily understand the present invention, the specific configurations are described. However, the present invention does not always provide all of the configurations described above. Also, a part of one configuration example can be replaced with another configuration example, and the configuration of one embodiment can be added with the configuration of another embodiment. Also, in a part of the respective configuration examples, another configuration can be added, deleted, or replaced.

What is claimed is:

1. A wind power generator,
wherein a nacelle is located on an upper portion of a support rod, a rotor head having wind turbine blades fitted thereto is rotatable supported to a front end side of the nacelle, and a main shaft that rotates integrally with the rotor head, a gear box that is coupled with the main shaft which rotates while the wind turbine blades receive a wind power, a power generator having a rotor driven by a shaft output of the gear box, a brush, and a slip ring, and a humidity management device that controls humidity inside of the power generator having the brush and the slip ring, are installed in an interior of the nacelle,
wherein the humidity management device includes
a humidity sensor that measures the humidity inside of the power generator having the brush and the slip ring;
a humidifier that compares a humidity value inside of the power generator having the brush and the slip ring, which is measured by the humidity sensor, with an optimum humidity value inside of the power generator having the brush and the slip ring, which is set in advance, and humidifies the interior of the power generator when the compared humidity value is equal to or lower than the set value; and
a dehumidifier that dehumidifies the interior of the power generator when the compared humidity value is larger than the set value.

2. The wind power generator according to claim 1, further comprising:
an input unit that receives the humidity value inside of the power generator having the brush and the slip ring, which is measured by the humidity sensor;
a humidity setting unit that sets the optimum humidity value inside of the power generator having the brush and the slip ring in advance; and
a comparator unit that compares the humidity value inside of the power generator having the brush and the slip ring, which is measured by the humidity sensor from the input unit, with the optimum humidity value inside of the power generator having the brush and the slip ring, which is set by the humidity setting unit in advance.

3. The wind power generator according to claim 1, further comprising:

a voltage measurement system that measures a voltage between the brush and the slip ring inside of the power generator,
wherein if an output from the humidity sensor falls within a given value, and the voltage between the brush and the slip ring, which is measured by the voltage measurement system, is equal to or lower than a given value, the humidifier conducts humidification, and if an output from the voltage measurement system is equal to or higher than a given value, the dehumidifier conducts dehumidification.

4. The wind power generator according to claim 3, further comprising:
an input unit that receives the humidity value inside of the power generator having the brush and the slip ring, which is measured by the humidity sensor, and the voltage between the brush and the slip ring, which is measured by the voltage measurement system;
a humidity/voltage setting unit that sets the optimum humidity value inside of the power generator having the brush and the slip ring, and the voltage between the brush and the slip ring in advance; and
an arithmetic unit that compares the humidity value inside of the power generator having the brush and the slip ring, which is measured by the humidity sensor from the input unit, with the optimum humidity value inside the power generator having the brush and the slip ring, which is set in advance by the humidity/voltage setting unit, and the voltage between the brush and the slip ring from the input unit with the voltage between the brush and the slip ring, which is set in advance.

5. The wind power generator according to claim 1, wherein the humidifier and the dehumidifier stop the humidity management when the power generator stops.

6. The wind power generator according to claim 1, wherein the humidifier and the dehumidifier are connected to each other through a water supply pipe, and water taken by dehumidification of the dehumidifier is fed to the humidifier through the water supply pipe, and recycled by the humidifier.

7. The wind power generator according to claim 1, wherein the humidifier and the dehumidifier operate with supply of an electric power generated by the power generator.

8. The wind power generator according to claim 1, wherein the humidifier supplies water in a water tank by a pump, or supplies seawater by the pump.

9. The wind power generator according to claim 1, wherein a ventilation fan is located in an interior of the nacelle, and the ventilation fan is driven to introduce an external air from an inlet formed in a front surface of the nacelle, and discharge the air from an outlet communicating with a fan exit to an external of the nacelle to ventilate and cool the interior of the nacelle.

10. A wind power generator,
wherein a nacelle is located on an upper portion of a support rod, a rotor head having wind turbine blades fitted thereto is rotatable supported to a front end side of the nacelle, and a main shaft that rotates integrally with the rotor head, a gear box that is coupled with the main shaft which rotates while the wind turbine blades receive a wind power, a power generator having a rotor driven by a shaft output of the gear box, a brush, and a slip ring, and a humidity management device that controls humidity inside of the power generator having the brush and the slip ring, are installed in an interior of the nacelle, and wherein the humidity management device is disposed inside of the power generator having the brush and the slip ring, and includes a humidity adjustment sheet that adsorbs moisture if the humidity inside of the power generator is high, and releases the moisture if the humidity is low.

11. The wind power generator according to claim 10, wherein the humidity adjustment sheet is made of a synthetic rubber containing superabsorbent polymer therein.

* * * * *